US008155695B2

(12) United States Patent
Wang et al.

(10) Patent No.: US 8,155,695 B2
(45) Date of Patent: Apr. 10, 2012

(54) APPARATUS AND METHOD TO IMPROVE WLAN PERFORMANCE IN A DUAL WLAN MODALITY ENVIRONMENT

(75) Inventors: Huaiyuan Wang, Cary, NC (US); Jacobus C. Haartsen, Hardenberg (NL)

(73) Assignee: Sony Ericsson Mobile Communications AB, Lund (SE)

( * ) Notice: Subject to any disclaimer, the term of this patent is extended or adjusted under 35 U.S.C. 154(b) by 771 days.

(21) Appl. No.: 12/181,361

(22) Filed: Jul. 29, 2008

(65) Prior Publication Data
US 2010/0029325 A1 Feb. 4, 2010

(51) Int. Cl.
H04M 1/00 (2006.01)
H04W 4/00 (2009.01)
H04B 7/00 (2006.01)

(52) U.S. Cl. ............. 455/553.1; 370/338; 455/41.2
(58) Field of Classification Search ............ 455/553.1; 370/338
See application file for complete search history.

(56) References Cited

U.S. PATENT DOCUMENTS

| 6,917,598 B1 | 7/2005 | Emeott et al. |
| 7,002,929 B2 | 2/2006 | Struhsaker et al. |
| 7,046,649 B2 | 5/2006 | Awater et al. |
| 2006/0239223 A1 | 10/2006 | Sherman et al. |
| 2007/0232358 A1 | 10/2007 | Sherman |
| 2008/0089261 A1* | 4/2008 | Wentink ............ 370/311 |
| 2008/0130603 A1* | 6/2008 | Wentink et al. ......... 370/338 |

FOREIGN PATENT DOCUMENTS

| WO | 2004/006751 | 1/2004 |
| WO | 2005/117287 | 12/2005 |
| WO | 2008/067505 | 6/2008 |
| WO | 2008/075316 | 6/2008 |

OTHER PUBLICATIONS

International Search Report and Written Opinion for International Application No. PCT/IB2009/000159 dated Jun. 15, 2009.
International Preliminary Report on Patentability for International Application No. PCT/IB09/000159 dated Oct. 29, 2010.

* cited by examiner

Primary Examiner — Un C Cho
Assistant Examiner — Muthuswamy Manoharan
(74) Attorney, Agent, or Firm — Renner, Otto, Boisselle & Sklar, LLP

(57) ABSTRACT

A portable communication device including a first wireless transceiver operable under a first communication protocol for transmitting and receiving signals and a second wireless transceiver operable under a second communication protocol for transmitting and receiving signals and a method for controlling transmission of signals from an access point to the first wireless transceiver by limiting transmission of information from the associated access point to the first wireless transceiver to time slots or sub-frames associated with the second wireless transceiver in which the second wireless transceiver does not transmit.

18 Claims, 7 Drawing Sheets

APPARATUS AND METHOD TO IMPROVE WLAN PERFORMANCE IN A DUAL WLAN MODALITY ENVIRONMENT

TECHNICAL FIELD OF THE INVENTION

The present invention relates to an apparatus and method to improve wireless local area network (WLAN) communications for communication devices that utilize dual WLAN communication modalities (e.g., Bluetooth and IEEE 802.11, Wireless Wide Area Network and IEE802.11).

DESCRIPTION OF THE RELATED ART

Electronic equipment, such as portable communication devices, have evolved from voice-only electronic devices to multi-functional electronic devices. For example, portable communication devices, such as mobile telephones, may now function as electronic organizers, digital cameras, audio applications (e.g., MP3 players), video applications (e.g., video players), video game terminals, etc. Moreover, portable communication devices are not only used for voice communications, but they also are used in a variety of other forms (e.g., in instant messaging applications, sharing photographs, gaining access to information on the Internet, etc).

One driver behind the increased capabilities of electronic equipment is the proliferation of multi-radio design and implementation in wireless mobile devices. In addition to wide area network (WAN) technologies (e.g., UMTS/HSPA/LTE, CDMA/EV-DO/UMB, and WiMAX), peripheral technologies such as wireless local area network (WLAN) (e.g., IEEE 802.11) and Bluetooth have become more and more integral in future mobile devices.

Multi-radio coexistence has become an increasingly important issue as more and more heterogeneous radios, which operate in adjacent or overlapping frequency bands, are packed into a space-confined portable communication device platform. In such cases, in-band and out-of-band interference may cause the receiver of one radio to be blocked by the simultaneous transmission from another co-locating radio due to insufficient signal isolation.

Coexistence has been a long standing problem between WLAN (IEEE 802.11 b/g/n) and Bluetooth as both operate in the 2.4~2.5 GHz ISM band. Similar coexistence challenges also exist between WLAN (IEEE 802.11 b/g/n) operating in the 2.4~2.5 GHz ISM band and WWAN (IEEE 802.16e, IEEE 802.16m and 3GPP TDD) operating in the adjacent 2.5~2.69 GHz IMT-2000 3 G Extension band or the 2.3~2.4 GHz band. The problems may be summarized in two usage scenarios: 1) signals transmitted by the WLAN transmitter may interfere with reception of Bluetooth or WWAN signals by a Bluetooth or WWAN receiver; and 2) signals transmitted by the Bluetooth or WWAN transmitter may interfere with reception of WLAN signals by the WLAN receiver.

In the WLAN and Bluetooth coexistence scenario, the first problem has been somewhat mitigated by the so-called PTA (Packet Traffic Arbitration) mechanism defined in IEEE 802.15.2 and implemented by most vendors in combination with WLAN-Bluetooth integrated circuits and improved signaling between the two radios modules. In short, the IEEE 802.15.2 PTA solution causes WLAN transmission to be blocked when Bluetooth is receiving higher priority (voice) packets. This solution minimizes the impact on signals received by the Bluetooth transceiver, which originate from the WLAN transceiver. With respect to the WLAN and WWAN coexistence scenario, there has not been any industry wide solution for such scenario.

SUMMARY

The second problem identified above is more subtle and more difficult to solve for at least two reasons. First, the WLAN access point is not aware of the Bluetooth or WWAN transmission and reception schedule. Second, there is no synchronization between the WLAN access point and the Bluetooth and/or WWAN transceiver of the portable communication device. A need exists for a method and an electronic device having a WLAN transceiver and a Bluetooth and/or WWAN transceiver to provide appropriate signaling to prevent the WLAN access point from transmitting to the electronic device during each of the Bluetooth transmit slots and/or WWAN TDD uplink sub-frames.

Aspects of the present invention are applicable to any multi-radio coexistence wherein the isolation between radios, which may operate in overlapping or non-overlapping bands, is not large enough, meaning that the transmit spectrum of one radio interferes with the reception of another radio. For example, the 2.5 GHz extension band is not completely adjacent to the 2.4 GHz band. The 2.4 GHz band ends at 2483.5 MHz, whereas the 2.5 GHz band starts at 2500 MHz. These bands are deemed to be "adjacent" in the context of the present invention since the isolation between radios operating in these frequencies are likely to interfere (i.e., the transmit spectrum of one radio is likely to interfere with the reception of another radio).

One aspect of the present invention relates to a coexistence solution that makes use of the fact that when the WLAN transceiver and the Bluetooth or the WWAN transceiver are both transmitting, interference between the signals can be eliminated and/or substantially reduced. Likewise, when the WLAN transceiver and the Bluetooth or the WWAN transceiver are both receiving, interference between the signals can be eliminated and/or substantially reduced.

One aspect of the present invention relates to a portable communication device including: a first wireless transceiver operable under a first communication protocol for transmitting and receiving signals; a second wireless transceiver operable under a second communication protocol for transmitting and receiving signals; a controller coupled to the first transceiver and the second transceiver, wherein the controller coordinates transmission and reception of the first transceiver and the second transceiver by limiting transmission of information from the associated access point to the first wireless transceiver to time slots or sub-frames associated with the second wireless transceiver in which the second wireless transceiver does not transmit.

Another aspect of the invention relates to a signal being transmitted from the first transceiver to an associated access point during at least a portion of a transmit time slot or uplink sub-frame associated with the second transceiver such that an acknowledgment signal will be received from the associated access point at the first transceiver during a receive time slot or downlink sub-frame associated with the second transceiver.

Another aspect of the invention relates to the signal transmitted from the first transceiver to the associated access point is an uplink trigger frame.

Another aspect of the invention relates to the uplink trigger frame (UTF) including a voice over Internet Protocol (VoIP) payload, a non-real-time payload, or a null payload.

Another aspect of the invention relates to the first communication protocol is a wireless local area network protocol.

Another aspect of the invention relates to the wireless local area network protocol being an IEEE 802.11 communication protocol.

Another aspect of the invention relates to the second communication protocol being a Bluetooth compatible communication protocol or a wireless wide area network compatible communication protocol.

Another aspect of the invention relates to the first transceiver being operable at a first frequency range and the second transceiver is operable at a second frequency range, wherein at least a portion of the first frequency range and the second frequency range overlap and/or are adjacent.

Another aspect of the invention relates to the device being power saving mode prior to initializing transmission of the signal in a sleep mode when transmitting the signal from the first transceiver to the associated access point.

One aspect of the invention relates to a method of coordinating wireless communications in a portable communication device having a first radio system and a second radio system, the method including: providing a portable communication device having a first wireless transceiver operable under a first communication protocol for transmitting and receiving signals at a first frequency range and a second wireless transceiver operable under a second communication protocol for transmitting and receiving signals at a second frequency range, wherein at least a portion of the first frequency range and the second frequency range overlap and/or are adjacent; controlling transmission of signals from the associated access point to the first wireless transceiver by limiting transmission of information from the associated access point to the first wireless transceiver to receive time slots or downlink sub-frames associated with the second wireless transceiver in which the second wireless transceiver does not transmit.

Another aspect of the invention relates to the step of controlling transmission of signals from the associated access point to the first wireless transceiver further including transmitting a signal from a first radio system to an associated access point such that a down link acknowledgment signal will be received from the associated access point at the first transceiver during a receive time slot or downlink sub-frame associated with the second transceiver.

Another aspect of the invention relates to the signal being transmitted from the first radio system to the associated access point is transmitted during at least a portion of a transmit time slot or uplink sub-frame associated with the second radio system.

Another aspect of the invention relates to the signal transmitted from the first radio system to the associated access point is transmitted during at least a portion of an inactive time slot or sub-frame associated with the second radio system.

Another aspect of the invention relates to the signal being transmitted from the first radio system to the associated access point is an uplink trigger frame (UTF).

Another aspect of the invention relates to the UTF includes a Voice over Internet Protocol (VoIP) payload.

Another aspect of the invention relates to the portable communication device being in a power saving mode when initializing transmission of the signal from the first radio system to the associated access point.

Another aspect of the invention relates to controlling transmission of signals from the associated access point to the portable communication devices including determining a transmit opportunity end point by calculating a minimum value of either $t_{RX}-SIFS-T_{UTF}-T_{ACK}-SIFS$ or $t_{RX}-D_{TX}$, where $t_{RX}$ is the starting time of the next RX slot or downlink sub-frame, $T_{ACK}$ is the transmission time of the uplink ACK at the most robust data rate, $T_{UTF}$ is the duration of the UTF packet, $D_{TX}$ is the duration of the TX slot or uplink sub-frame, and SIFS is the duration of a short interframe spacing.

Another aspect of the invention relates to controlling transmission of signals from the associated access point to the portable communication devices including the associated access point determining an amount of time it has to downlink transmission to the portable communication device, wherein the amount of time is equal to the transmit opportunity, which is indicated by the portable communication device in UTF, minus access point turnaround delay minus downlink ACK transmit time minus a SIFS duration time minus a duration time field as set in the UTF.

One aspect of the invention relates to a computer program stored on a machine readable medium, the program being suitable for coordinating wireless communications in a portable communication device having a first radio system and a second radio system, wherein when the program is loaded in memory in the portable communication device and executed causes the portable communication device to control transmission of signals from an associated access point to the first wireless radio system by limiting transmission of information from the associated access point to the first wireless transceiver to one or more time slots or downlink sub-frames associated with the second wireless transceiver in which the second wireless transceiver does not transmit.

Another aspect of the invention relates to the first radio system operating an IEEE 802.11 communication protocol and the second radio system operating a Bluetooth compatible communication protocol or a wireless wide area network compatible communication protocol.

Another aspect of the invention relates to the signal transmitted from the first radio system to the associated access point being transmitted during at least a portion of a transmit time slot and/or an inactive time slot and/or uplink sub-frame associated with the second radio system.

Another aspect of the invention relates to the signal transmitted from the first radio system to the associated access point being an uplink data frame (UDF).

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "portable communication device", includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
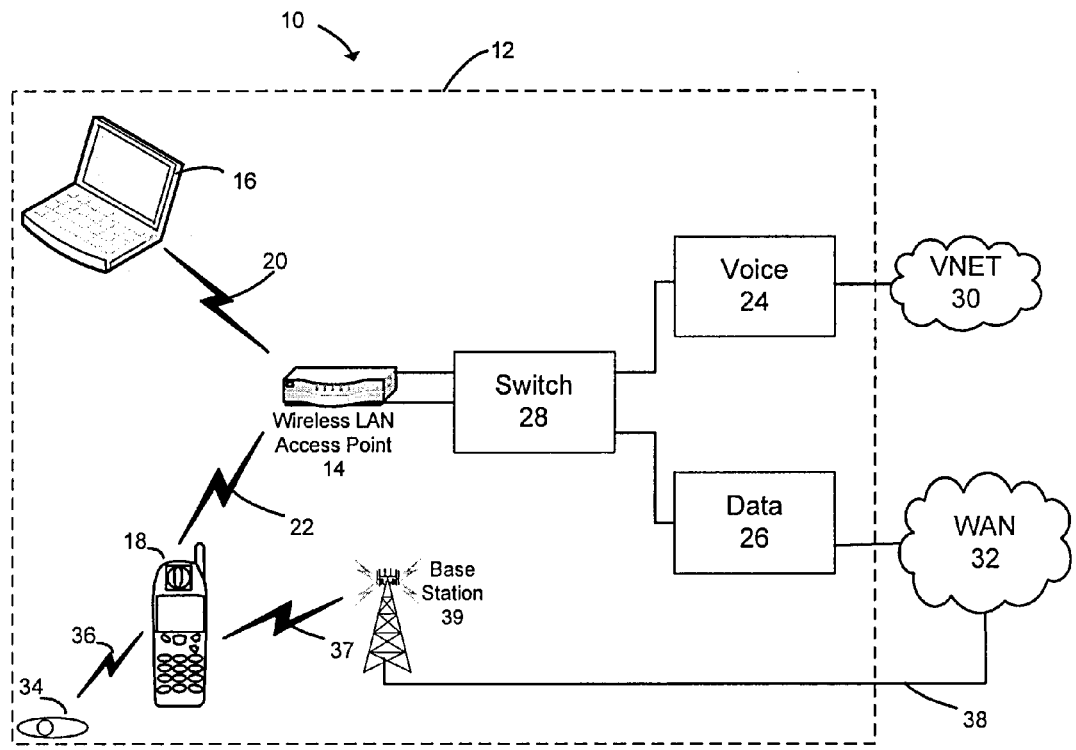
FIG. 1 is an exemplary block diagram of a system in accordance with aspects of the present invention.

Aspects of the present invention relate to a device and method to improve wireless local area network (WLAN) communications for communication devices that utilize dual WLAN communication modalities (e.g., Bluetooth and IEEE 802.11 or WWAN and IEEE 802.11). In particular, a coexistence solution is provided that makes use of the fact that when the WLAN transceiver and the Bluetooth/WWAN transceiver are both transmitting, interference between the two signals can be eliminated and/or substantially reduced. Likewise, when the WLAN transceiver and the Bluetooth/WWAN transceiver are both receiving, interference between the two signals can be eliminated and/or substantially reduced.

In one embodiment, a portable communication device includes a first wireless transceiver operable under a first communication protocol for transmitting and receiving signals and a second wireless transceiver operable under a second communication protocol for transmitting and receiving signals and a method for controlling transmission of signals from an access point to the first wireless transceiver by limiting transmission of information from the associated access point to the first wireless transceiver to time slots or sub-frames associated with the second wireless transceiver that are either a receive time slot or an inactive time slot or a downlink sub-frame. In other words, transmissions from the WLAN access point are limited to time slots or sub-frames when the second wireless transceiver (e.g., Bluetooth, WWAN, etc.) does not transmit.

One issue facing wireless system designers when considering voice and other time-sensitive services over a WLAN connection, such as one described by the IEEE 802.11 specification, is the power consumption of handheld devices. For example, in order to deliver competitive talk time and standby time, as compared to digital cordless or cellular devices, power conservation during voice calls become necessary. Several organizations have proposed power-efficient operation via transmit power control and physical layer rate adaptation for systems that rely on a centrally controlled contention-free channel access scheme. However, such approaches can be complex to implement and may not provide the power savings required to justify the complexity.

The 802.11 standard defines procedures that can be used to implement power management in a handheld device during periods of inactivity. The most commonly used power saving mechanisms are legacy power saving mode and Unscheduled Automatic Power Saving Delivery (U-APSD) mode. A portable communication device may combine these power saving mechanisms in various manners to support power management for different applications.

The 802.11 power saving operation involves alternating Active State and Sleep State:

Active State: There are generally two reasons for the portable communication device to wake up, namely to transmit pending data or to retrieve buffered data from the access point serving the portable communication device. Waking up to transmit data is a straightforward operation, driven by the portable communication device. The decision to wake up and receive data is also made by the portable communication device after monitoring its pending data bit in a periodic beacon frame transmitted by its access point. Once the portable communication device decides to transition from sleep state to active state, it notifies the access point by sending a PS-Poll frame when operating in legacy power saving mode or a trigger frame when operating in U-APSD mode. Following such transmission, the portable communication device remains active so the access point can send any buffered downlink frames afterward.

Sleep State: In legacy power saving mode, portable communication device transitions from Active State to Sleep State after receiving and acknowledging one downlink packet. In U-APSD mode, the portable communication device only switches back to Sleep State when instructed so by access point via the EOSP (End of Service Period) flag. The access point needs to buffer all traffic destined to the portable communication device when it is in Sleep State.

An exemplary architecture of a common dual mode WLAN system 10 is depicted in FIG. 1. The system 10 includes a network 12, consisting of an access point 14 and portable electronic equipment, such as a data station 16 and a portable communication device 18. The portable electronic equipment are connected to the access point via WLAN radio links 20, 22, respectively. The access point 14 may be coupled to a distribution network, including voice and data gateways 24, 26 respectively, through a switch 28. The portable communication device 18 may execute a Voice-over-IP (VoIP) application, which establishes a peer-to-peer connection with the voice gateway 24, representing the other end of the voice call, and which routes voice data to a voice network 30. Data station 16 may connect to the data gateway 26 via the access network and connect to, for example, a wide area network 32. The impact of data traffic on voice quality should be considered. It is assumed that both the voice and data stations employ a prioritized contention-based quality of service mechanism. The portable electronic equipment may also communicate directly to a base station 39, which connects to wide area network 32 via link 38, through a time division duplex (TDD) communication link 37 (e.g., 3GPP, 811.16e, etc.)

The portable communication device 18 may be wirelessly coupled to an accessory 34. The accessory 34 in the exemplary embodiment is a rendering device in the form of a headset. The accessory 34 is shown as an ear mountable speaker and microphone assembly that exchanges audio data with the portable communication device 18 over a wireless link 36. One of ordinary skill in the art will appreciate that any accessory operable to receive signals discussed herein is deemed to fall within the scope of the present invention. For example, suitable accessories include headphones, earphones, speakers, stereos, and the like.

The wireless link 36 between the portable communication device 18 and the headset 34 is established using a Bluetooth compatible protocol, such as in accordance with the Specification of the Bluetooth System, Covered Core Package version 2.0+EDR, dated Nov. 4, 2004. Bluetooth specifies communication protocols for low cost, low power wireless devices that operate over a very small area, the so-called, personal area network. These wireless devices may include, for example, telephone headsets, cell phones, Internet access devices, personal digital assistants, laptop computers, etc. Typically, the Bluetooth specification seeks to replace a connecting cable between communicating devices, for example, a mobile telephone and a headset, with a wireless radio link to provide greater ease of use by reducing the tangle of wires frequently associated with personal communication systems. Several such personal communication devices may be "wirelessly" linked together by using the Bluetooth specification.

Because Bluetooth devices operate in the unlicensed 2.4 GHz radio frequency band, they are subject to radio interference from other wireless devices operating in the same frequency band. To avoid radio frequency interference, the Bluetooth specification divides the 2.4 to 2.5 GHz frequency band into 1 MHz-spaced channels. Each channel signals data packets at 1 Mb/s, using a Gaussian Frequency Shift Keying modulation scheme. A Bluetooth device transmits a modulated data packet to another Bluetooth device for reception. After a data packet is transmitted and received, both devices retune their radio to a different 1 MHz channel, effectively hopping from radio channel to radio channel, i.e., frequency-hopping spread spectrum (FHSS) modulation, within the 2.4 to 2.5 GHz frequency band. In this way, Bluetooth devices use most of the available 2.4 to 2.5 GHz frequency band and if a particular signal packet transmission/reception is compromised by interference on one channel, a subsequent retransmission of the particular signal packet on a different channel may be possible for eSCO or ACL links.

Figure 2:
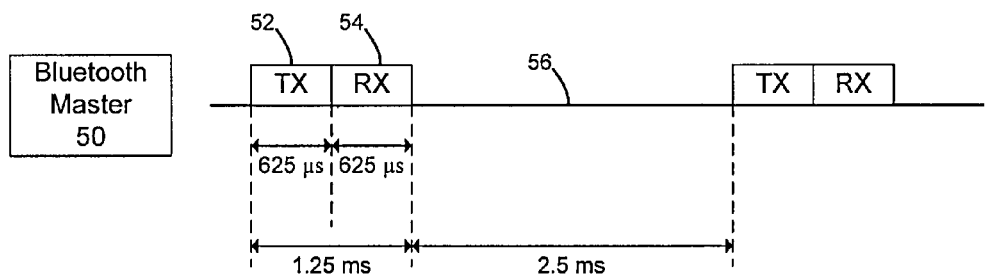
FIG. 2 is an exemplary Bluetooth timing sequence.

Bluetooth devices operate in one of two modes: as a Master device or a Slave device. The Master device provides a network clock and determines the frequency hopping sequence. One or more Slave devices synchronize to the Master's clock and follow the Master's hopping frequency. Bluetooth is a time division multiplexed system, where the basic unit of operation is a time slot of 625 μs. Referring to FIG. 2, the Master device first transmits to the Slave device during a first time slot of 625 μs with both devices tuned to the same radio frequency channel. Thus, the Master device transmits and the Slave device receives during the first time slot. Following the first time slot, the two devices retune their radios, or hop, to the next channel in the frequency hopping sequence for the second time slot. During the second time slot, the Slave device must respond whether it successfully understood, or not, the last packet transmitted by the Master during the first time slot. Thus, the Slave device transmits and the Master device receives during the second time slot. As a Slave device must respond to a Master's transmission, communication between the two devices requires at a minimum two time slots or 1.25 ms. For example, referring to FIG. 2, an exemplary Bluetooth time sequence is illustrated. The Master 50 outputs a transmit (TX) time slot 52 that has a duration of 625 μs. The Slave must respond during the receive (RX) time slot 54, which also has a duration of 625 μs. When a HV3 packet type is used on a SCO link, there will be a 2.5 ms inactive period 56 that consists of four (4) inactive time slots. Thus, voice packets are exchanged between Master and Slave every 3.75 milliseconds. This pattern repeats itself as necessary for communication purposes.

Data packets, when transmitted over networks, are frequently susceptible to delays by, for example, retransmissions of packets caused by errors, sequence disorders caused by alternative transmission pathways, etc. Packet delays do not cause much of a problem with the transmission of digital data because the digital data may be retransmitted or re-sequenced by the receiver without effecting the operation of computer programs using the digital data. However, packet delays or dropped packets during the transmission of voice signals can cause unacceptable quality of service.

The Bluetooth specification version 1.1 provides a Synchronous Connection Oriented (SCO) link for voice packets that is a symmetric link between Master and Slave devices with periodic exchange of voice packets during reserved time slots. The Master device will transmit SCO packets to the Slave device at regular intervals, defined as the SCO interval or $T_{SCO}$, which is counted in time slots. Bandwidth limitations limit the Bluetooth specification to a maximum of three SCO links. Hence, the widest possible spacing for an SCO pair of time slots, which are sometimes called a voice slot, is every third voice slot. Bluetooth specification version 1.2 provides enhanced SCO links, i.e., eSCO links, which have a larger voice slot size, based on N*625 μs time slots, with larger and configurable intervals between voice slots. These eSCO links can be used for both voice and/or data applications.

The IEEE 802.11 specification for WLANs also uses the same 2.4 GHz radio frequency band as Bluetooth devices. Therefore, radio interference often occurs when Bluetooth and WLAN devices try to communicate simultaneously over the same radio frequency band.

Figure 3:
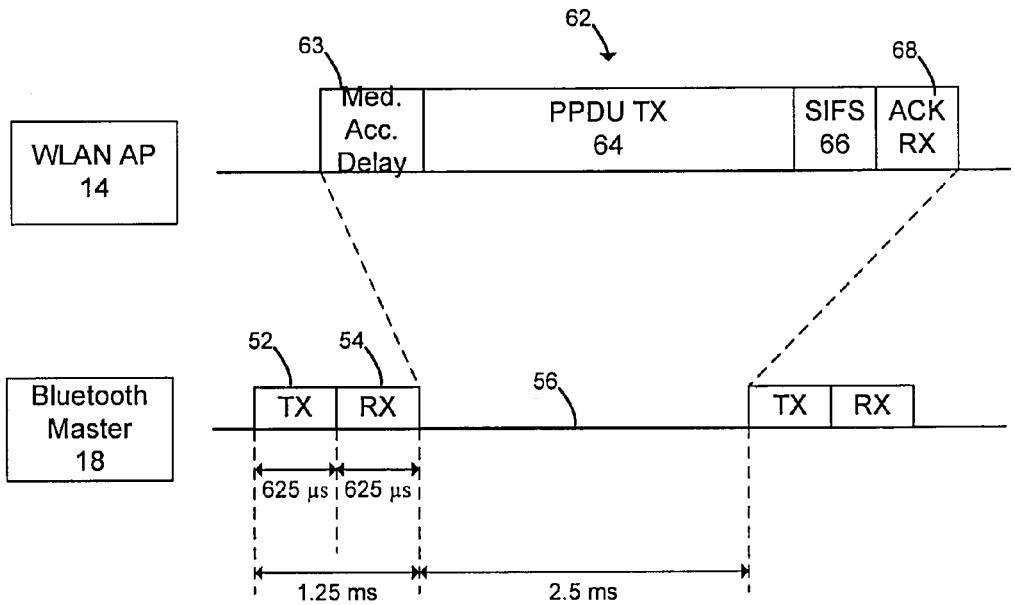
FIG. 3 is an exemplary timing sequence between a Bluetooth master and a WLAN access point.

For Example, FIG. 3 provides an exemplary illustration of a common problem that may be experienced by a portable communication device having a WLAN transceiver and a Bluetooth transceiver. That is, signals transmitted by the Bluetooth transceiver may interfere with reception WLAN signals by the WLAN transceiver. In FIG. 3, a Bluetooth SCO connection with HV3 packet is assumed.

The Bluetooth master 50 (e.g., a Bluetooth transceiver of a portable communication device) first transmits to the slave device (e.g., a mobile telephone accessory, such as a headset) during a first time slot 52 of 625 μs. During a first RX time slot 54, the slave device must respond to the master's transmission. Thus, communication between the two devices requires at a minimum two time slots or 1.25 ms. As shown in FIG. 2, which also assumes a Bluetooth SCO connection with HV3 packet type, there is a 2.5 ms inactive duration 56, which is made of four (4) time slots. As such, in this exemplary embodiment, a pair of time slots having a duration of 1.25 ms may be reserved for the BT SCO voice slot. In this exemplary embodiment, the BT SCO voice slots are repeated every 3.75 ms.

In order to avoid WLAN reception from being impacted by Bluetooth transmission, two requirements are generally needed to be met. First, the WLAN access point 14 must not transmit to the portable communication device 18 (e.g., the Bluetooth Master) during each of the Bluetooth TX slots. Second, the WLAN access point 14 must have knowledge about Bluetooth inactive period so as to fully utilize the period to transmit to the portable communication device 18.

To meet the first requirement, the portable communication device 18 (e.g., Bluetooth Master) may transmit a CTS (Clear-to-Send) message addressed to itself right before the arrival of the Bluetooth TX slot. In the CTS message, the Duration field is set to protect the entire Bluetooth TX duration. This mechanism is able to stop the WLAN access point 14 from transmitting to the mobile device (Bluetooth Master)

while the portable communication device is transmitting to the Bluetooth slave (the headset). There are two primary problems associated with this signaling mechanism: First, by setting the CTS duration to cover Bluetooth TX slot, it causes channel dead time. That is, no traffic may be exchanged between the access point 14 and any mobile stations (including those that do not have Bluetooth connections) during the CTS duration. Second, it may force an access point 14 to postpone the WLAN Beacon transmission, which will impact the overall system performance (such as association and hand-over functions).

Thus, the two primary problems generally require that all WLAN transmission from the portable communication device 18 takes place between the Bluetooth RX slots, and that all WLAN reception for the device takes place between the Bluetooth TX slots. Since the access point 14 is not aware of the gap between consecutive Bluetooth TX or RX slots, most vendors took an over-kill approach by mandating higher data rates at both the access point 14 and the portable communication devices in order to minimize the chances of interference. For example, as shown in FIG. 3, the access point 14 has to make sure it can transmit the largest possible packet and receive acknowledgement within the 2.5 ms gap (referred to as inactive period 56). As shown in FIG. 3, the exemplary packet exchange sequence 62 includes a medium access delay period 63, a downlink PLCP protocol data unit (PPDU) 64, short interframe space (SIFS) 66, and an uplink Acknowledge message 68. The implications of such approach [assuming: (1) size of the largest PPDU size of 2372 octets–PLCP Preamble (18 octets), PLCP Header (6 octets), Mac Header (32 octets), MSDU (2312 octets), FCS (4 octets); (2) size of the ACK packet is 38 octets; (3) SIFS=10 µs; and (4) average medium access delay of 18 µs] is that the minimum data rate must be 9 megabits per second and 11 megabits per second (mbps) for ERP-OFDM/DSSS-OFDM and ERP-PBCC/ERP-CCK communications, respectively.

Such approach is equivalent to setting a data rate floor regardless of channel conditions. In order to maintain high data rate when link condition is poor, the access point 14 has to either boost transmit power, apply heavy fragmentation, or resort to retransmissions, none of which is ideal by most system performance measures.

As discussed above, power savings is a primary concern for portable communication devices. The IEEE 802.11e standard defines a power saving mechanism known as Unscheduled Automatic Power Saving Delivery (U-APSD). U-ASPD allows the portable communication device to take the initiative as to when to contact the access point. Therefore, more efficient power savings modes can be implemented in the terminal.

Figure 4:
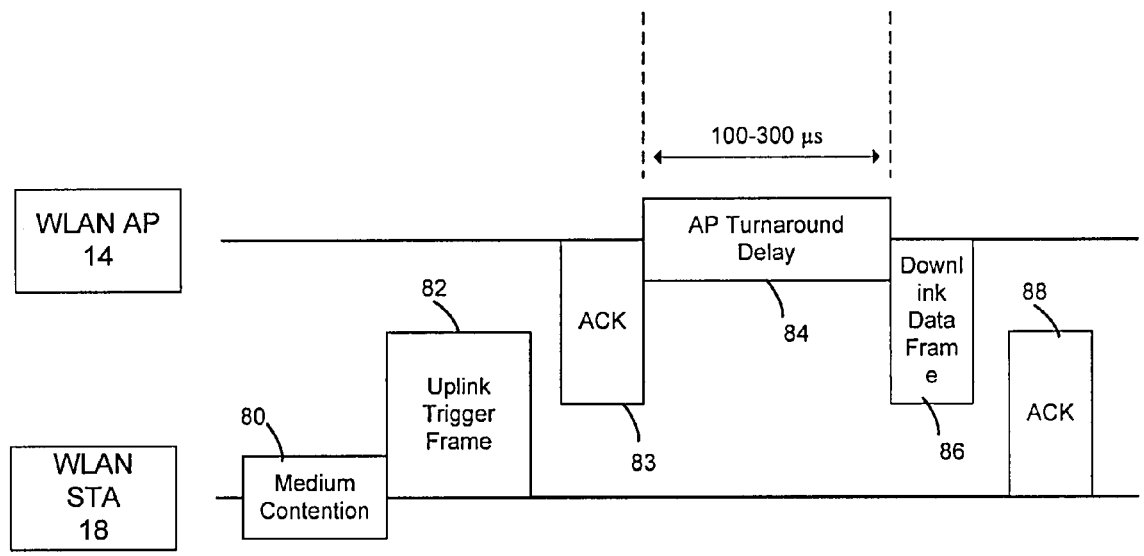
FIG. 4 is an exemplary timing sequence of an unscheduled automatic power savings delivery (U-APSD) mechanism.

The following is a brief description of U-APSD. Referring to FIG. 4, a timing diagram with the packet exchange between the WLAN access point (AP) 14 and the portable communication device (STA) 18 is illustrated. At block 80, the portable communication device will content for the medium. At block 82, an uplink trigger frame, which may be a data frame or a null frame, is transmitted through its WLAN transceiver to the AP 14. At block 83, the AP sends an ACK in response to the received the uplink trigger frame. At block 84, the AP checks if there is buffered traffic for the portable communication device and prepares for transmission if there is traffic waiting. This period is known as the "AP Turnaround Time" and, depending on actual implementations, usually lasts approximately 100~300 µs (the shorter the better from a power saving standpoint). At block 86, the AP sends a downlink data frame or a null frame (if there is no buffered traffic) with an indication whether there is further downlink transmission to follow. At block 88, the portable communication device sends an ACK in response to receiving the downlink frame. Blocks 86 and 88 may be repeated until the AP signals the End-of-Service-Period (EOSP) in a downlink data or null frame.

Figure 5:
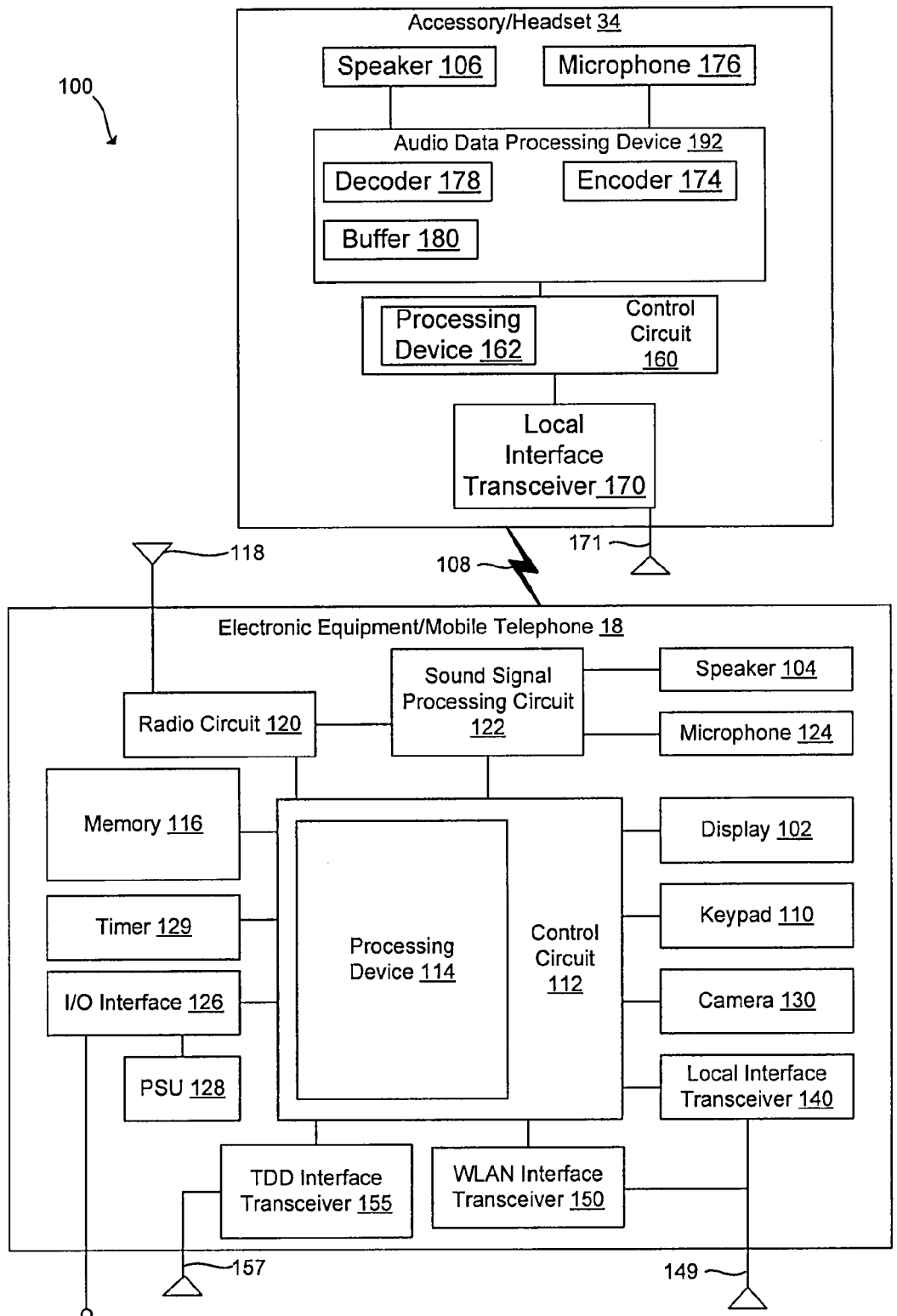
FIG. 5 is an exemplary block diagram of a portable communication device and an accessory in accordance with aspects of the present invention.

Referring to FIGS. 1 and 5, a portable communication device assembly 100 is shown in accordance with the present invention. The illustrated electronic equipment assembly 100 includes portable communication device 18 and a wirelessly coupled accessory 34 (e.g., a headset). The portable communication device 18 includes a display 102. The display 102 presents information to a user such as operating state, time, telephone numbers, contact information, various navigational menus, etc., which enables the user to utilize the various features of the portable communication device 18. The display 102 may also be used to visually display content accessible by the portable communication device 18 and/or accessory 34 from one or more remote sources (e.g., a media server, a network, etc.). The displayed content may include audio and/or video presentations stored locally in memory 104 of the portable communication device 18 and/or stored remotely from the portable communication device 18 (e.g., on a remote storage device, a media server, remote personal computer, etc.).

The audio component may be broadcast to the user with a speaker 104 of the portable communication device 18. Alternatively, the audio component may be broadcast to the user with a speaker 106 (FIG. 4) of the accessory 34. For stereo listening, the accessory 34 may include a pair of speakers 106. The accessory 34 generally receives audio data from the portable communication device 18 through a wireless Bluetooth communication link 108.

The portable communication device 18 further includes a keypad 110 that provides for a variety of user input operations. For example, the keypad 110 may include alphanumeric keys for allowing entry of alphanumeric information such as telephone numbers, phone lists, contact information, notes, etc. In addition, the keypad typically may include special function keys such as a "call send" key for initiating or answering a call, and a "call end" key for ending, or "hanging up" a call. Special function keys may also include menu navigation keys, for example, for navigating through a menu displayed on the display 102 to select different telephone functions, profiles, settings, etc., as is conventional. Other keys associated with the portable communication device 18 may include a volume key, audio mute key, an on/off power key, a web browser launch key, a camera key, etc. Keys or key-like functionality may also be embodied as a touch screen associated with the display 18.

The portable communication device 18 includes conventional call circuitry that enables the portable communication device 18 to establish a call and/or exchange signals with a called/calling device, typically another mobile telephone or landline telephone. However, the called/calling device need not be another telephone, but may be some other device such as an Internet web server, content providing server, etc.

The portable communication device 18 includes a primary control circuit 112 that is configured to carry out overall control of the functions and operations of the portable communication device 18. The control circuit 112 may include a processing device 114, such as a CPU, microcontroller or microprocessor. The processing device 114 executes code stored in a memory (not shown) within the control circuit 112 and/or in a separate memory, such as memory 116, in order to carry out conventional operation of the portable communication device 18. The memory 116 may be, for example, a buffer, a flash memory, a hard drive, a removable media, a volatile memory and/or a non-volatile memory. In addition, the processing device 114 executes code to carry out various functions of the portable communication device 18.

Continuing to refer to FIGS. 1 and 5, the portable communication device 18 includes an antenna 118 coupled to a radio circuit 120 (e.g., GSM, 3G, etc). The radio circuit 120 includes a radio frequency transmitter and receiver for transmitting and receiving signals via the antenna 118 as is conventional. The portable communication device 18 further includes a sound signal processing circuit 122 for processing the audio signal transmitted by/received from the radio circuit 120. Coupled to the sound processing circuit 122 are the speaker 104 and a microphone 124 that enable a user to listen and speak via the portable communication device 18, as is conventional. The radio circuit 120 and sound processing circuit 122 are each coupled to the control circuit 112 so as to carry out overall voice operations of the portable communication device 18.

The portable communication device 18 also includes the aforementioned display 102 and keypad 110 coupled to the control circuit 112. The portable communication device 18 further includes an I/O interface 126. The I/O interface 126 may be in the form of typical mobile telephone I/O interfaces, such as a multi-element connector at the base of the portable communication device 18. As is typical, the I/O interface 126 may be used to couple the portable communication device 18 to a battery charger to charge a power supply unit (PSU) 128 within the portable communication device 18. In addition, or in the alternative, the I/O interface 126 may serve to connect the portable communication device 18 to a wired personal hands-free adaptor, to a personal computer or other device via a data cable, etc. The portable communication device 18 may also include a timer 129 for carrying out timing functions. Such functions may include timing the durations of calls, generating the content of time and date stamps, etc.

The portable communication device 18 may include various built-in accessories, such as a camera 130 for taking digital pictures. Image files corresponding to the pictures may be stored in the memory 116 and/or in a removable memory (not shown). In one embodiment, the portable communication device 18 also may include a position data receiver (not shown), such as a global positioning satellite (GPS) receiver, Galileo satellite system receiver or the like.

To establish wireless communication with other locally positioned devices, such as the accessory 34, another portable communication, a computer, a printer, etc., the portable communication device 18 may include a local wireless interface transceiver 140, such as a Bluetooth transceiver for transmitting and receiving information to and/or from the accessory 34.

To establish communications with network-based content, the portable communication device 18 further include a wireless local area network interface transceiver 150. Preferably, the WLAN transceiver 150 is compatible with one or more IEEE 802.11 protocols (e.g., 802.11(a), 802.11(b) and/or 802.11(g), etc.) and allows the portable communication device 18 to acquire a unique identifier (e.g., MAC and IP addresses) on an associated network and communicate with one or more devices on the network, assuming the user has the appropriate privileges and/or has been properly authenticated.

To establish communications with network-based content over WWAN, the portable communication device 18 further include a WWAN interface transceiver 155. Preferably, the WWAN transceiver 155 is compatible with one or more time division duplex protocols (e.g., (e.g., IEEE 802.16e, WiMAX, 3GPP, etc.) and allows the portable communication device 18 to be uniquely identified on an associated network and communicate with one or more devices on the network, assuming the user has the appropriate privileges and/or has been properly authenticated to receive bandwidth allocations.

Local wireless interface transceiver 140 and WLAN transceiver 150 are illustrated in FIG. 5 as utilizing a common antenna 149. One of ordinary skill in the art will appreciate that the local wireless interface transceiver 140 and the WLAN transceiver 150 may utilize separate antennas. The WWAN transceiver 155 is illustrated using antenna 157 to transmit and receive WWAN information.

The portable communication device 18 may be configured to operate in a wide area communications system (not illustrated). The system can include one or more servers, media gateways, and/or call control elements for managing calls placed by and destined to the portable communication device 18, transmitting network-based content (e.g., image files, audio files, video files, etc.) to the portable communication device 18 and carrying out any other control functions. The wide area network system may communicate with the portable communication device 18 via a network and a transmission medium. The transmission medium may include any appropriate device or assembly, including, for example, a communications tower, another mobile telephone, a wireless access point, a router, a satellite, etc. Portions of the network may include wired and/or wireless transmission pathways.

The accessory 34 includes a primary control circuit 160 that is configured to carry out overall control of the functions and operations of the accessory 34. The control circuit 160 may include a processing device 162, such as a CPU, microcontroller or microprocessor. The processing device 162 executes code stored in a memory (not shown) within the control circuit 160 and/or in a separate memory, such as memory (not shown), in order to carry out operation of the accessory 34, as described herein. The memory may be, for example, a buffer, a flash memory, a hard drive, a removable media, a volatile memory and/or a non-volatile memory. In addition, the processing device 162 executes code to carry out various functions of the accessory 34. Although not shown, the accessory 34 may include a user interface (e.g., a display, buttons, keys, etc.).

The accessory 34 includes a local interface transceiver 170 that is compatible with the local interface transceiver 140 of the portable communication device 18 to establish a wireless communications between the accessory 34 and the portable communication device 18 through a Bluetooth communication link 108, for example. The local interface transceiver 170 is coupled to the control circuit 162 to selectively control and process information and/or data received and/or transmitted by the local interface transceiver 170 through the antenna 171. Preferably, as discussed above, the local interface transceiver 170 is Bluetooth compatible. The wireless interface established between adapters 140 and 170 may be used to exchange data, such as audio data, commands, control and/or status information between the portable communication device 18 and the accessory 34. One of ordinary skill in the art will understand the basic operations of a Bluetooth wireless communication interface, so the details will not be described here in detail for the sake of brevity.

The accessory 34 further includes an audio data processing device 172 that manages audio data. For example, the audio data processing device 172 may include an encoder 174 that encodes an audio signal received from a microphone 176 coupled to the accessory 34. Encoded audio data may be transmitted to the portable communication device 18 for use as part of a telephone call.

In addition, the audio data processing device 172 may include a decoder 178 and a data buffer 180 to process audio data received from the portable communication device 18 and/or one or more devices associated with a network.

The received audio data may be incoming audio data associated with a telephone call (including Voice over Internet Protocol (VoIP). In other situations, the audio data received by the accessory 34 may be audio (e.g., music, sound, voice, etc.) derived from an audio file played back by the portable communication device 18.

In accordance with the Bluetooth specification, audio data transmitted from the portable communication device 18 to the accessory 34 is typically in the form of media packets. Each media packet may contain a quantity of audio data, such as about 5 milliseconds of audio data. The audio data may be buffered by the buffer 180 and decoded by the decoder 178 into an audio signal for delivery to the speaker 106. As will be appreciated, the audio data may be mono, stereo or surround-sound, or arranged in any other suitable audio format.

Figure 6:
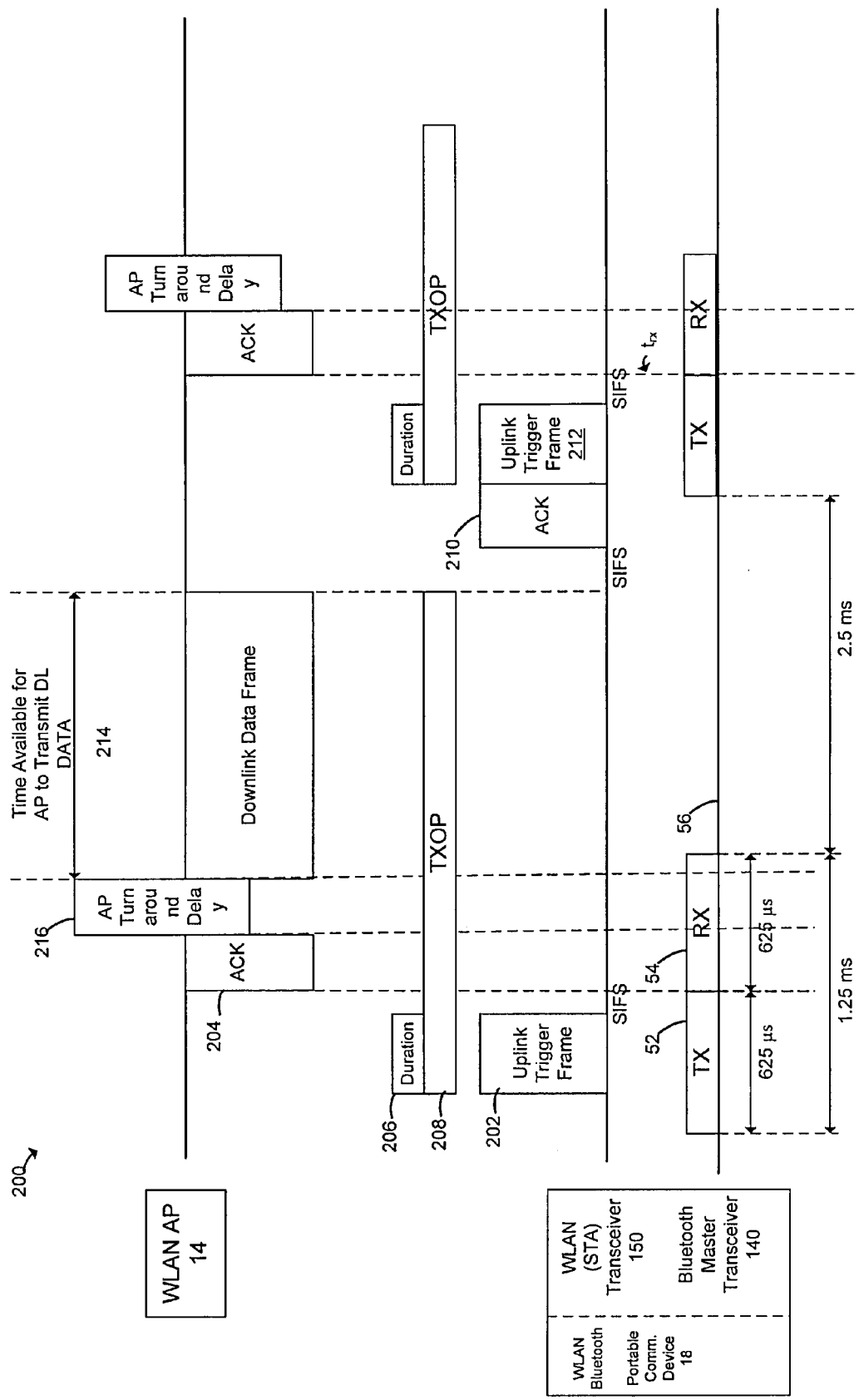
FIGS. 6 and 7 are exemplary timing sequences for Bluetooth and WLAN coexistence solution in accordance with aspects of the present invention.

An exemplary method 200 in accordance with aspects of the invention is illustrated in FIG. 6. FIG. 6 illustrates an exemplary timing diagram with the packet exchange between the access point (AP) 14 and the portable communication device (STA) 18. The method 200 assumes that the portable communication device 18 is in a power saving mode when initializing transmission of the signal (see Active State discussed above) and returns to the Sleep State when the access point indicates EOSP in a downlink data or null frame addressed to the portable communication device 18.

At block 202, once the portable communication device 18 decides to transition from the Sleep State to the Active State, it notifies the access point 14 by sending a signal (e.g., an uplink trigger frame (UTF)) to the access point 14 through the WLAN transceiver 150. Generally, the uplink trigger frame may include a power-save (PS) bit set to active. Following such transmission, the portable communication device 18 remains active so the access point 14 can send any buffered downlink frames afterward. At step 204, an acknowledgement (ACK) is transmitted from the access point 14 to the WLAN transceiver 150 in response to receiving the signal (e.g., the UTF). As shown in FIG. 5, the uplink trigger frame, which is a WLAN data packet, may at least partly coincide with the Bluetooth TX slot 52. The received ACK signal should coincide with the Bluetooth RX slot 54. Between the WLAN packet exchanges, there is a Short Inter-Frame Spacing (SIFS), e.g., SIFS=10 µs in 802.11b.

With the knowledge of the uplink packet size and the uplink data rate, the portable communication device 18 is able to determine when to start sending the UTF such that the downlink ACK will happen after the beginning of the Bluetooth RX slot. The determination of when to start sending the UTF may take into account any uncertainty in the contention window, i.e., on a carrier sense, the determination should take into account the random back-off number that is used. In addition, the portable communication device 18 may also take into consideration the average medium access delay observed in the past. If the UTF packet has no payload (NULL frame—480 bits), it may be sent during the Bluetooth TX slot 54 (i.e., starts later than the TX slot leading edge). If the UTF packet has a payload (e.g. with VoIP data of certain voice CODEC), the UTF packet may start earlier, even earlier than the Bluetooth TX slot leading edge. The primary goal is that the leading edge of the downlink WLAN ACK packet 204 closely aligns with the leading edge of the Bluetooth RX slot 54.

In general, the UTF conveys the following information to the access point 14: 1) In the MAC header, set Duration Field 206 to protect the uplink trigger transmission; and 2) in the quality of service (QoS) Control field, set transmit opportunity (TXOP) 208, as shown in FIG. 6. The maximum TXOP is determined by the uplink ACK 210 and next UTF 212. The TXOP window shall end at: $\text{MIN}(t_{RX}-\text{SIFS}-T_{UTF}-T_{ACK}-\text{SIFS}), (t_{RX}-D_{TX}))$, where $t_{RX}$ is the starting time of the next Bluetooth RX slot, $T_{ACK}$ is the transmission time of the uplink ACK at the most robust rate, $T_{UTF}$ is the duration of the UTF packet, and $D_{TX}$ is the duration of the Bluetooth TX slot. Therefore, the TXOP window ends at the smaller value of $(t_{RX}-\text{SIFS}-T_{UTF}-T_{ACK}-\text{SIFS})$ or $(t_{RX}-D_{TX})$.

Upon receiving the UTF transmitted from the WLAN transceiver 150 of the portable communication device 18, the access point 14 generally performs the following tasks: 1) the access point determines out how much time 214 it has for downlink traffic exchange based on the AP Turn around Delay 216 and the TXOP. This can be calculated using the following algorithm:

Traffic Exchange Duration=TXOP−Turnaround Delay−ACK Tx Time−SIFS−Duration Field in the UTF The access point 14 then selects the appropriate payload size (fragment if necessary) and data rate based on the available traffic exchange duration.

Figure 7:
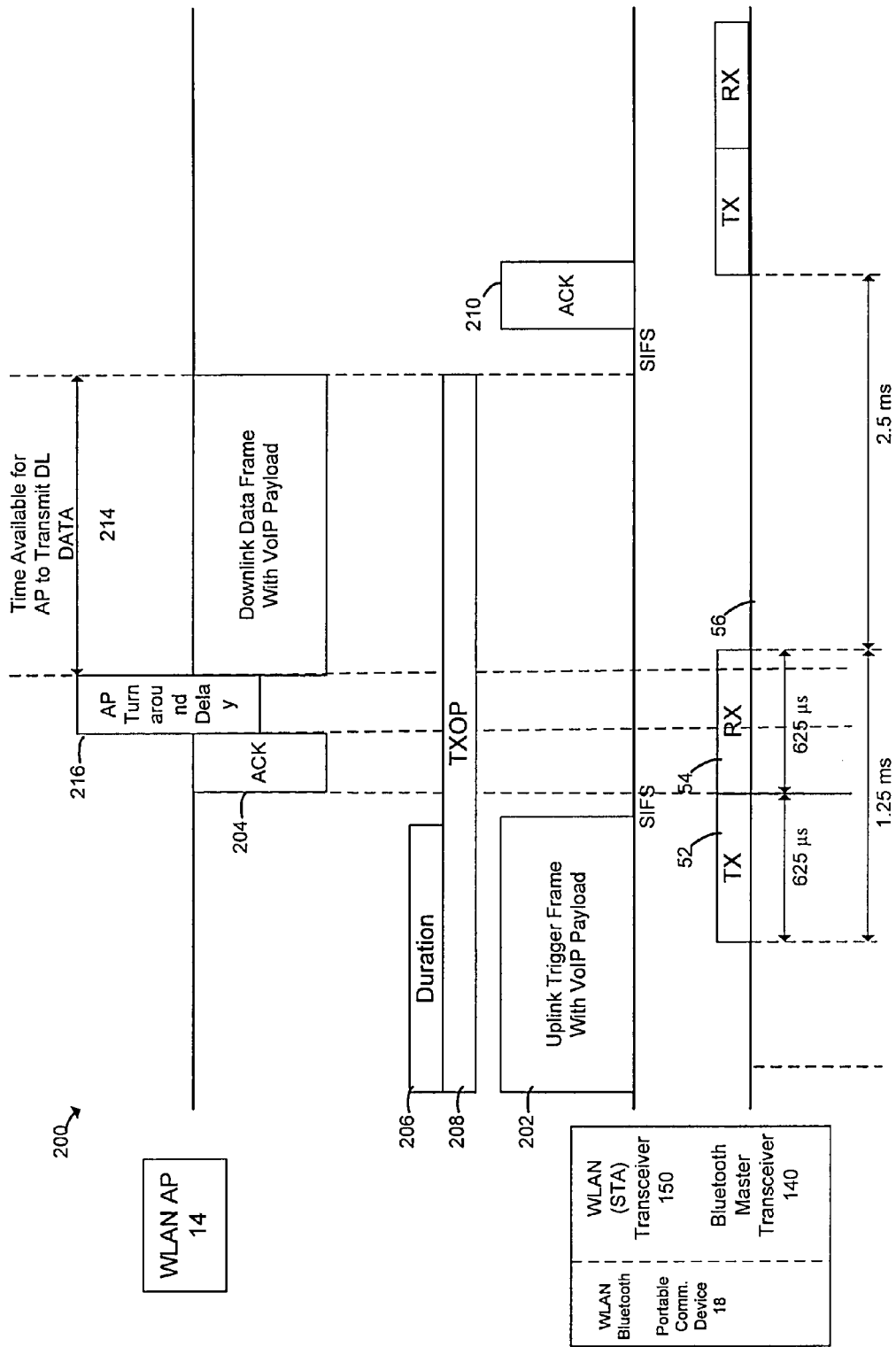

Aspects of the invention may be used for non-real time (best effort) WLAN traffic. In addition, aspects of the invention can also be used for VoIP traffic as it solves the QoS problems usually encountered when the portable communication device 18 has VoIP data being received from the AP 14 and a Bluetooth voice link to the user's accessory 34 (e.g., a headset). Since VoIP is periodic and symmetric, the terminal sends uplink VoIP packet in the UTF and retrieves downlink VoIP packet from the AP using the scheme shown in FIG. 6. A typical VoIP transaction is shown in FIG. 7. For 64 kb/s VoIP and the most robust data rate (e.g., 1 mbps), the WLAN packet lengths are on the order of 1.8 ms. For lower rate speech codecs and/or higher data rates, shorter packets will result.

FIG. 7 is identical to FIG. 6 except that the UTF 200 includes VoIP payload that is initiated prior to receiving the leading edge of the TX time slot 52. The Duration Field 206 is set to protect the uplink trigger mechanism. Aspects of the present invention allow the portable communication device 18 to synchronize WLAN traffic with Bluetooth traffic. In addition, by aligning the TX and RX transitions in the Bluetooth and WLAN traffic, a maximum window is created that allows undisturbed transmission and reception. In addition, by signaling the proper TXOP to the access point, WLAN reception coincides with Bluetooth reception or inactive slots.

Figure 8:
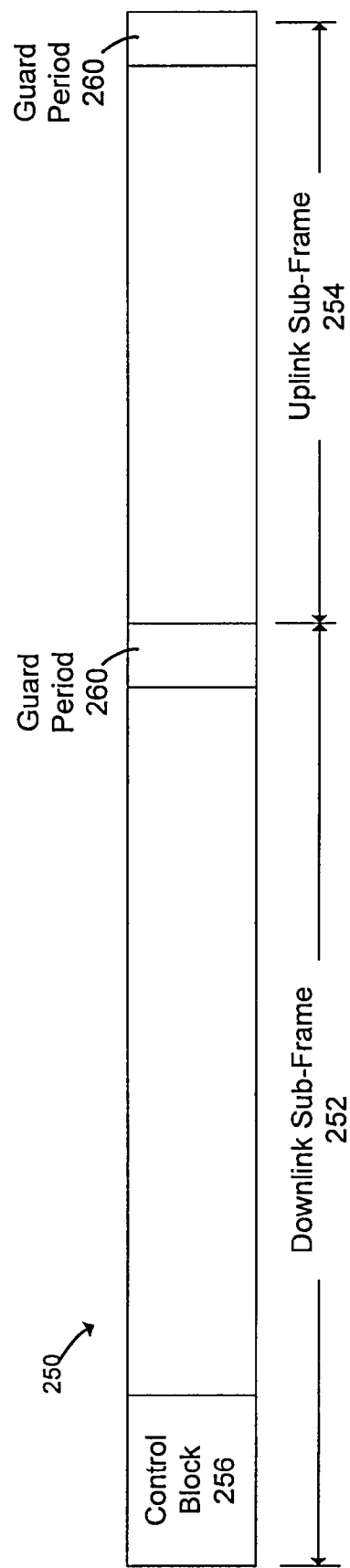
FIG. 8 is an exemplary time division duplex (TDD) frame structure of a WWAN system.
Figure 9:
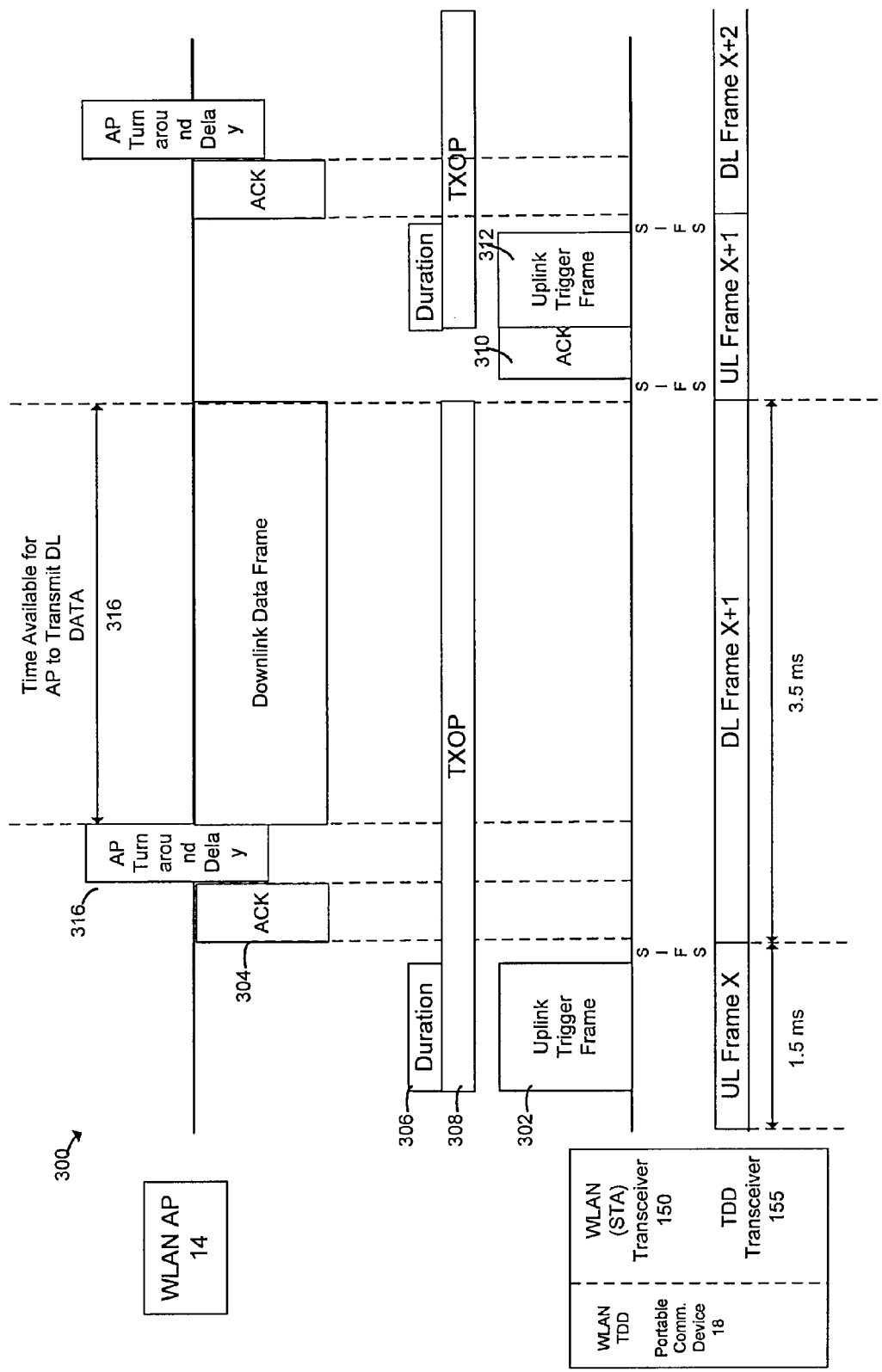
FIG. 9 is an exemplary timing sequence for a WWAN TDD system and WLAN coexistence solution in accordance with aspects of the present invention.

Aspects of the invention may also be used for coexistence between WLAN and WWAN (e.g., IEEE 802.16e, IEEE 802.16m, 3GPP, etc.), as illustrated in FIGS. 8 and 9. Referring to FIG. 8, an exemplary time division duplex (TDD) frame 250 is illustrated. The TDD frame 250 includes a downlink sub-frame 252 and an uplink sub-frame 254. As used herein "downlink" refers to network traffic from the base station (e.g., base station 39) to the portable communication device and "uplink" refers to network traffic from the portable communication device to the base station.

As shown in FIG. 8, a typical TDD frame 250 usually contains downlink sub-frame 252, in which portable communication devices receive information from a base station (e.g., base station 39), and uplink sub-frame 254, in which the portable communication devices transmit information to base station. The lengths of downlink and uplink sub-frames are configured by a predefined ratio. For instance, if the length of the TDD frame is 5 ms and the downlink-to-uplink ratio is 70 to 30, the lengths of corresponding downlink and uplink sub-frames will be 3.5 ms and 1.5 ms, respectively.

A typical TDD frame 250 may further include some form of control block 256, and one or more idle guard periods 260. It is noted that additional frame components may be present but are not illustrated for purposes of brevity.

The control block 256 is commonly positioned in the beginning of a TDD frame. The control block (also commonly referred to as MAP) informs the portable communication device whether there is data or control signals addressed to it in the downlink sub-frame and, if data is present, where (in the packet) the data is located. In addition, the control block also informs the portable communication device whether the portable communication device gets grants to transmit data or control signals to the base station and, if granted such rights, informs the device of which uplink sub-frame it may transmit. The guard periods 260 are provided as time gaps to give the transceiver time to switch between receive and transmit functions.

Referring to FIG. 9, an exemplary timing sequence (also referred to as method 300) for a WWAN TDD system and WLAN coexistence is illustrated in accordance with aspects of the present invention. FIG. 9 illustrates three exemplary TDD frames (e.g., TDD Frame X, TDD Frame X+1, and TDD FRAME X+2). The following assumptions are made with the respect to the TDD frames: 1) the frames are 5 ms in duration and have a ratio of 70% downlink and 30% uplink (such that the downlink duration is 3.5 ms and the uplink duration is 1.5 ms). The guard periods are not shown. In addition, the portable communication device receives and transmits in every frame (i.e., the portable communication device is not operating in sleep mode).

Referring to FIG. 9, at block 302, the portable communication device 18 transmits a signal (e.g., an uplink trigger frame (UTF)) to the access point 14 through the WLAN transceiver 150. At step 304, an acknowledgement (ACK) is transmitted from the access point 14 to the WLAN transceiver 150 in response to receiving the signal (e.g., the UTF). As shown in FIG. 10, the uplink trigger frame (e.g. signal 302), which is WLAN data packet, may at least partly coincide with the uplink portion of the TDD Frame X (as shown in FIG. 9) (where X is a nominal TDD frame from which to designate future TDD frames). The received ACK signal should coincide with the beginning of the next TDD frame (e.g., TDD frame X+1, as shown in FIG. 9). Between the WLAN packet exchanges, there is a Short Inter-Frame Spacing (SIFS), e.g., SIFS=10 µs in 802.11b.

With the knowledge of the uplink packet size and the uplink data rate, the portable communication device 18 is able to determine when to start sending the UTF such that the downlink ACK will happen after the beginning of the TDD frame, within the down-link portion of the next sub-frame (e.g., TDD frame X+1). The determination of when to start sending the UTF may take into account any uncertainty in the contention window, i.e., on a carrier sense, the determination should take into account the random back-off number that is used. In addition, the portable communication device 18 may also take into consideration the average medium access delay observed in the past. The primary goal of such transmission is that the leading edge of the downlink WLAN ACK packet 304 closely aligns with the leading edge of the downlink sub-frame of next TDD frame.

In general, the UTF conveys the following information to the access point 14: 1) In the MAC header, set Duration Field 306 to protect the uplink trigger transmission; and 2) in the quality of service (QoS) Control field, set transmit opportunity (TXOP) 308, as shown in FIG. 9. The maximum TXOP is determined by the next uplink ACK 310 and next UTF 312. The TXOP window shall end at: $\text{MIN}(t_{RX}-\text{SIFS}-T_{UTF}-T_{ACK}-\text{SIFS}), (t_{RX}-D_{TX}))$, where $t_{RX}$ is the starting time of the next downlink sub-frame, $T_{ACK}$ is the transmission time of the uplink ACK at the most robust rate, $T_{UTF}$ is the duration of the UTF packet, and $D_{TX}$ is the duration of the TDD uplink sub-frame.

Upon receiving the UTF transmitted from the WLAN transceiver 150 of the portable communication device 18, the access point 14 generally performs the following tasks: 1) the access point determines out how much time 314 it has for downlink traffic exchange based on the AP Turn around Delay 16 and the TXOP 308. This can be calculated using the following algorithm:

Traffic Exchange Duration=TXOP–Turnaround Delay–ACK Time–SIFS–Duration Field in the UTF The access point 14 then selects the appropriate payload size (fragment if necessary) and data rate based on the available traffic exchange duration.

The coexistence functionality described herein may be a computer program stored in the portable communication device. The computer program may be downloaded from a network and/or installed from CD and/or DVD and installed in memory 116. The processing device 114 executes code the computer program in order to carry out the functionality described with respect to FIGS. 3-9. For example, the control circuit 112 is generally coupled to the first transceiver 150 and the second transceiver 140, 155 wherein the controller coordinates transmission and reception of the first transceiver and the second transceiver by limiting transmission of information from the associated access point to the first wireless transceiver to time slots or sub-frames associated with the second wireless transceiver in which the second transceiver does not transmit.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments.

In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A portable communication device comprising:
    a first wireless transceiver operable under a first communication protocol for transmitting and receiving signals;
    a second wireless transceiver operable under a second communication protocol for transmitting and receiving signals;
    a controller coupled to the first transceiver and the second transceiver, wherein the controller coordinates transmission and reception of the first transceiver and the second transceiver by limiting transmission of information from the associated access point to the first wireless transceiver to time slots or sub-frames associated with the second wireless transceiver in which the second wireless transceiver does not transmit, wherein the controller causes transmission of a signal from a first radio system to an associated access point such that a downlink acknowledgment signal will be received from the associated access point at the first wireless transceiver during a receive time slot or downlink sub-frame associated with the second wireless transceiver and the controller determines a transmit opportunity end point by calculating: a minimum value of either tRX-SIFS-TUTF-TACK-SIFS or tRX-DTX, where tRX is the starting time of a next Bluetooth receive slot or downlink sub-frame, TACK is the transmission time of an uplink acknowledgement signal at a most robust rate, TUTF is a duration of the uplink trigger frame, and DTX is the duration of the Bluetooth transmit slot or uplink sub-frame, and SIFS is the duration of a short interframe spacing.

2. The portable communication device of claim 1, wherein a signal is transmitted from the first transceiver to an associated access point during at least a portion of a transmit time slot or uplink sub-frame associated with the second transceiver such that an acknowledgment signal will be received from the associated access point at the first transceiver during a receive time slot or downlink sub-frame associated with the second transceiver.

3. The portable communication device of claim 2, wherein the signal transmitted from the first transceiver to the associated access point is an uplink trigger frame.

4. The portable communication device of claim 3, wherein the uplink trigger frame includes a voice over Internet Protocol (VoIP) payload, a non-real-time payload, or a null payload.

5. The portable communication device of claim 1, wherein the first communication protocol is a wireless local area network protocol.

6. The portable communication device of claim 5, wherein the wireless local area network protocol is an IEEE 802.11 communication protocol.

7. The portable communication device of claim 1, wherein the second communication protocol is a Bluetooth compatible communication protocol or a wireless wide area network compatible communication protocol.

8. The portable communication device of claim 1, wherein the first transceiver is operable at a first frequency range and the second transceiver is operable at a second frequency range, wherein at least a portion of the first frequency range and the second frequency range overlap and/or are adjacent with insufficient spectrum separation.

9. The portable communication device of claim 1, wherein the device is in a power saving mode when initializing transmission of the signal from the first transceiver to the associated access point.

10. A method of coordinating wireless communications in a portable communication device having a first radio system and a second radio system, the method comprising:
    providing a portable communication device having a first wireless transceiver operable under a first communication protocol for transmitting and receiving signals at a first frequency range and a second wireless transceiver operable under a second communication protocol for transmitting and receiving signals at a second frequency range, wherein at least a portion of the first frequency range and the second frequency range overlap and/or are adjacent with insufficient spectrum separation;
    controlling transmission of signals from the associated access point to the first wireless transceiver by limiting transmission of information from the associated access point to the first wireless transceiver to receive time slots or downlink sub-frames associated with the second wireless transceiver in which the second wireless transceiver does not transmit, wherein the step of controlling transmission of signals from the associated access point to the first wireless transceiver further includes transmitting a signal from a first radio system to an associated access point such that a downlink acknowledgment signal will be received from the associated access point at the first transceiver during a receive time slot or downlink sub-frame associated with the second transceiver and wherein the step of controlling transmission of signals from the associated access point to the portable communication devices includes determining a transmit opportunity end point by calculating: a minimum value of either tRX-SIFS-TUTF-TACK-SIFS or tRX-DTX, where tRX is the starting time of a next Bluetooth receive slot or downlink sub-frame, TACK is the transmission time of the uplink acknowledgement signal at a most robust rate, TUTF is a duration of the uplink trigger frame, and DTX is the duration of the Bluetooth transmit slot or uplink sub-frame, and SIFS is the duration of a short interframe spacing.

11. The method of claim 10, wherein the signal transmitted from the first radio system to the associated access point is transmitted during at least a portion of a transmit time slot or uplink sub-frame associated with the second radio system.

12. The method of claim 11, wherein the UTF includes a Voice over Internet Protocol (VoIP) payload.

13. The method of claim 10, wherein the signal transmitted from the first radio system to the associated access point is transmitted during at least a portion of an inactive time slot or sub-frame associated with the second radio system.

14. The method of claim 10, wherein the signal transmitted from the first radio system to the associated access point is an uplink trigger frame (UTF).

15. The method of claim 10, wherein the portable communication device is in a power saving mode when initializing transmission of the signal from the first radio system to the associated access point.

16. A method of coordinating wireless communications in a portable communication device having a first radio system and a second radio system, the method comprising:
provide a portable communication device having a first wireless transceiver operable under a first communication protocol for transmitting and receiving signals at a first frequency range and a second wireless transceiver operable under a second communication protocol for transmitting and receiving signals at a second frequency range, wherein at least a portion of the first frequency range and the second frequency range overlap and/or are adjacent with insufficient spectrum separation;
controlling transmission of signals from the associated access point to the first wireless transceiver by limiting transmission of information from the associated access point to the first wireless transceiver to receive time slots or downlink sub-frames associated with the second wireless transceiver in which the second wireless transceiver does not transmit, wherein the signal transmitted from the first radio system to the associated access point is transmitted during at least a portion of a transmit time slot or uplink sub-frame associated with the second radio system and wherein the step of controlling transmission of signals from the associated access point to the portable communication devices includes the associated access point determining an amount of time to download complete downlink transmission to the portable communication device, wherein the amount of time is equal to the transmit opportunity as set forth in the uplink trigger frame minus turnaround delay minus downlink acknowledgement transmit time minus a short interframe spacing duration time minus a duration time field as set in the signal.

17. A computer program stored on a machine readable medium, the program being suitable for coordinating wireless communications in a portable communication device having a first radio system and a second radio system, wherein when the program is loaded in memory in the portable communication device and executed causes the portable communication device to control transmission of signals from an associated access point to the first wireless radio system by limiting transmission of information from the associated access point to the first wireless transceiver to one or more time slots or sub-frames associated with the second wireless transceiver in which the second wireless transceiver does not transmit, wherein the step of controlling transmission of signals from the associated access point to the first wireless transceiver further includes transmitting a signal from a first radio system to an associated access point such that a downlink acknowledgment signal will be received from the associated access point at the first transceiver during a receive time slot or downlink sub-frame associated with the second transceiver and wherein the step of controlling transmission of signals from the associated access point to the portable communication devices includes determining a transmit opportunity end point by calculating: a minimum value of either tRX-SIFS-TUTF-TACK-SIFS or tRX-DTX, where tRX is the starting time of a next Bluetooth receive slot or downlink sub-frame, TACK is the transmission time of the uplink acknowledgement signal at a most robust rate, TUTF is a duration of the uplink trigger frame, and DTX is the duration of the Bluetooth transmit slot or uplink sub-frame, and SIFS is the duration of a short interframe spacing.

18. The computer program of claim 17, wherein the first radio system is operating an IEEE 802.11 communication protocol and the second radio system is operating a Bluetooth compatible communication protocol or a wireless wide area network compatible communication protocol.

* * * * *